(12) United States Patent
Flanders et al.

(10) Patent No.: X9395
(45) Date of Patent: Feb. 13, 1836

(54) WINNOWING WHEAT

(76) Inventors: David Flanders; Calender Rathburn

David Sanders and Calender Rathburn

Letters Patent

The schedule referred to in these Letters Patent and making part of the same con
-taining a description in the words of the said David Sanders and Calen
der Rathburn themselves of their improvement in the machine for fann
ing and cleaning all kinds of grain.

The construction of this machine or mill, is very plain and simple
and is as follows. First it consists of boards, 3 ft 6 inches in length to stand
endwise matched together 3 ft 8 inches in width: the head of the said
barrel 2 ft in diameter this is to be placed 4½ inches from the bottom up
and 3 quarters of an inch from the back in front: the air hole to be cut
11 inches in diameter an upright piece is to be placed perpendicular across
the air-hole; next a shaft is to be 21 inches in length from shoulder to shoulder
with wood or iron [illegible] may run in wood [illegible] iron or
other metal boxes, four arms are put through sd. shaft to which the fans
are attached 8 inches in width cylindered so as to fill the space in the
said barrel sd barrel is to be covered with half inch stuff length 21
inches commencing 4 inches from the center on the top in front winding
under the bottom and up the back and commence raising the covering
12 inches back of the center on the top raising 5 inches on the center and
is continued on the same true curve 24 inches towards the front from the
back end, and ten inches from the top tip down leaving a space for the
wind 8 inches the shoe to be 15 inches in width 2 feet 7 inches in length
the hind end resting on a pivot, the bottom board to pitch sufficiently to
carry or slide down. the chaff sieve 14 by 16 upper sieve or riddle 1½ inch below
bottom board, next sieve 1½ inches below the riddle sd. sieve to be [illegible]
pitching in front. Next a screen of chaff wire netting commencing in front
[illegible] below the lower sieve descending back 12 inches falling 6 inches below
the sieve extending 3 inches further on a level with the sieve then a square

United States Patent

Patent No.: X9395

[illegible] inch which forms a spout sufficient to shake out the grain, next a rolling
screen, wire netting one eight of an inch mesh one foot in diameter
in the center 18 inches long tapering 3 inches at the small end, a head
is cut in snug and nailed thru the center of the head is a hole 6
inches in diameter thru which a spout convays the grain from the
upper screen which spout is fastened to the left side the mill. Sd screen
is supported with a shaft, and arms and rolls in the center 20 inches up
and 7 inches in front of the wind barrel, the grain may be let out at the
left side the mill by hoisting a [illegible] or down the slides the grain
to the rolling screen, the grain that goes thru the roling screen drops
out the big end into a spout which conducts it into the half bushell or
box 9 or 10 inches above the floor on the side side the mill under sd
screen is a draw 12 inches wide and so reach the length of the screen
to be cut in the left side the mill snug to the wind barrel, the bottom 9
inches above the floor under this another drawer to catch the headings
to shine in front 7 inches high wide and long enought to fill the space
from the front to the wind barrel. Sd mill is to be supported by 2 3
inch peces dufluited [illegible] to be bolted up 29 inches from the bottom
above which a slide is made, a little inclining to the front by hoisting
or lowing to conduct the headings to the front drawer between the screens
is another slide to carry the chips or cockle to the screen drawer or the
rolling screen by side the wind barrel 2 3 inch peces a dufluited
across the top 7 inches from the ends, between which the hopper is built
sinking it below, the peces, the front pece supports the same by 2
large wires. the upper corners of sd mill is rounded the back corners covered
with a board [illegible] below this a slide door that shuts up the end
above the barrel, next a shaft that is attached to the turning wheal goes
thru the center of the 8 inch space or outlet of the wings, next a
wheal 8 inches in diameter 2 inches thick is to be made fast in the
center. Sd wheal is to be fluted or creased out three eights of an inch
deep and half inch wide commencing in the center carrying it
about 5 eights of an inch to the rite then back to the center on a true
circle, then the same to the left and so on, making from 4 to 6 shakes to the turning wheels going once round, a Small round iron which is
pushed to the Sieve in front plays into the Crevis which Sha-kes the
Sieve, this Shaking wheal may be made of wood or cast iron,
may be fluted out on a rim with [illegible] iron to ply each side of it
sd mill may be cast iron gearing or wood and bands sd Turning
wheal of cast iron 26 inches in diameter shaking wheal or pan 5½
inches a Small puly wheal on the shaft inside the turning wheal
4 inches in diameter, the wheal that turns the roling Screen 8 inch
-es in diameter to go with a band by adding an extra wheal and place
-ing the gearing on the other side the mill, sd wheels may be much
smaller for tightning the bands, by lever or pry [illegible] or Screw and
pully. There may be dampers to slide over the air holes if necessary
to shut out the wind. The manner of Shaking the grain & the roll
-ing Screen constitute the principal [illegible] claimed as our invention
or improvement Witnesses
Jonathan Wallace
Rufus Blodgett David Sanders
Calender Rathburn Exd
[illegible]